US007379667B2

(12) United States Patent
Nabetani

(10) Patent No.: US 7,379,667 B2
(45) Date of Patent: May 27, 2008

(54) IMAGE-TAKING APPARATUS

(75) Inventor: Hitoshi Nabetani, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 312 days.

(21) Appl. No.: 11/228,809

(22) Filed: Sep. 16, 2005

(65) Prior Publication Data

US 2006/0062571 A1    Mar. 23, 2006

(30) Foreign Application Priority Data

Sep. 17, 2004    (JP) ............................ 2004-270697

(51) Int. Cl.
*G03B 17/02* (2006.01)
*G03B 7/26* (2006.01)

(52) U.S. Cl. ...................... 396/539; 396/277
(58) Field of Classification Search ................ 396/277, 396/439, 535, 539, 542
See application file for complete search history.

(56) References Cited

U.S. PATENT DOCUMENTS 6,714,248 B1 *   3/2004   Inoue ......................... 348/372
7,133,277 B2 *   11/2006   Ikari et al. .................. 361/600

* cited by examiner

*Primary Examiner*—Rodney E Fuller
(74) *Attorney, Agent, or Firm*—Cowan, Liebowitz & Latman, P.C.

(57) ABSTRACT

An image-taking apparatus includes an image-taking system for obtaining an image of a subject, the image-taking system including a lens and an image pickup device, a battery loading part, into which a battery is loaded, the battery loading part being arranged in a place not to overlap said image-taking system in a direction of a thickness of said image-taking apparatus, a first substrate having a digital circuit, and a second substrate having an analog circuit, wherein the first and second substrates are arranged at both sides of the battery loading part in said direction of a thickness.

6 Claims, 4 Drawing Sheets

IMAGE-TAKING APPARATUS

BACKGROUND OF THE INVENTION

The present invention relates to an image-taking apparatus that includes both analog and digital circuits.

Along with the recent improved functions of the image-taking apparatuses and associated speeding up of the digital interfaces for connections with external apparatuses, some problems have arisen, such as unnecessary noises emitted to the air and disturbed images due to the interference between analog and digital circuits in the image-taking apparatus, particularly on an analog output of an image display apparatus, such as a TV, in the image-taking apparatus.

For reduced noises and excellent images, the potential differences among grounds of all the circuits should be strictly reduced. For this purpose, a battery armature connected to a battery that makes a reference potential of the image-taking apparatus and both the analog and digital circuits should be arranged close to one another.

On the other hand, the miniaturization of the image-taking apparatus restricts the arrangement freedom of connectors for the digital and analog outputs and the battery.

Prior art disclose, as in Japanese Patent Application, Publication No. 2002-072321, a circuit board that has a digital-output (USB) connector and an analog-output (VIDEO) connector arranged on a single substrate, rather than two separate boards, such as an analog board and a digital board. The conventional configuration may possibly cause noises and malfunctions resulting from the electromagnetic waves generated from the electric circuits.

BRIEF SUMMARY OF THE INVENTION

It is an exemplary object of the present invention to provide a small image-taking apparatus with few noises and interferences among circuits.

An image-taking apparatus according to one aspect of the present invention includes an image-taking system for obtaining an image of a subject, the image-taking system including a lens and an image pickup device, a battery loading part, into which a battery is loaded, the battery loading part being arranged in a place not to overlap said image-taking system in a direction of a thickness of said image-taking apparatus, a first substrate having a digital circuit, and a second substrate having an analog circuit, wherein the first and second substrates are arranged at both sides of the battery loading part in said direction of a thickness An image-taking apparatus according to another aspect of the present invention includes an image-taking system for obtaining an image of a subject, the image-taking system including a lens and an image pickup device, a battery loading part, into which a battery is loaded, the battery loading part being arranged in a place not to overlap said image-taking system in a direction of a thickness of said image-taking apparatus, a connector for external connections; and a contact member in contact with an electrode of the battery loaded in the battery loading part, wherein the battery loading part includes a spring for forcing the battery in an ejecting direction, the spring being arranged between the connector and the contact member along the first direction.

Other objects and further features of the present invention will become readily apparent from the following description of the preferred embodiments with reference to accompanying drawings.

DETAILED DESCRIPTION OF THE PREFERRED EMBODIMENTS

Referring now to the accompanying drawings, a description will be given of a preferred embodiment of the present invention.

Figure 1:
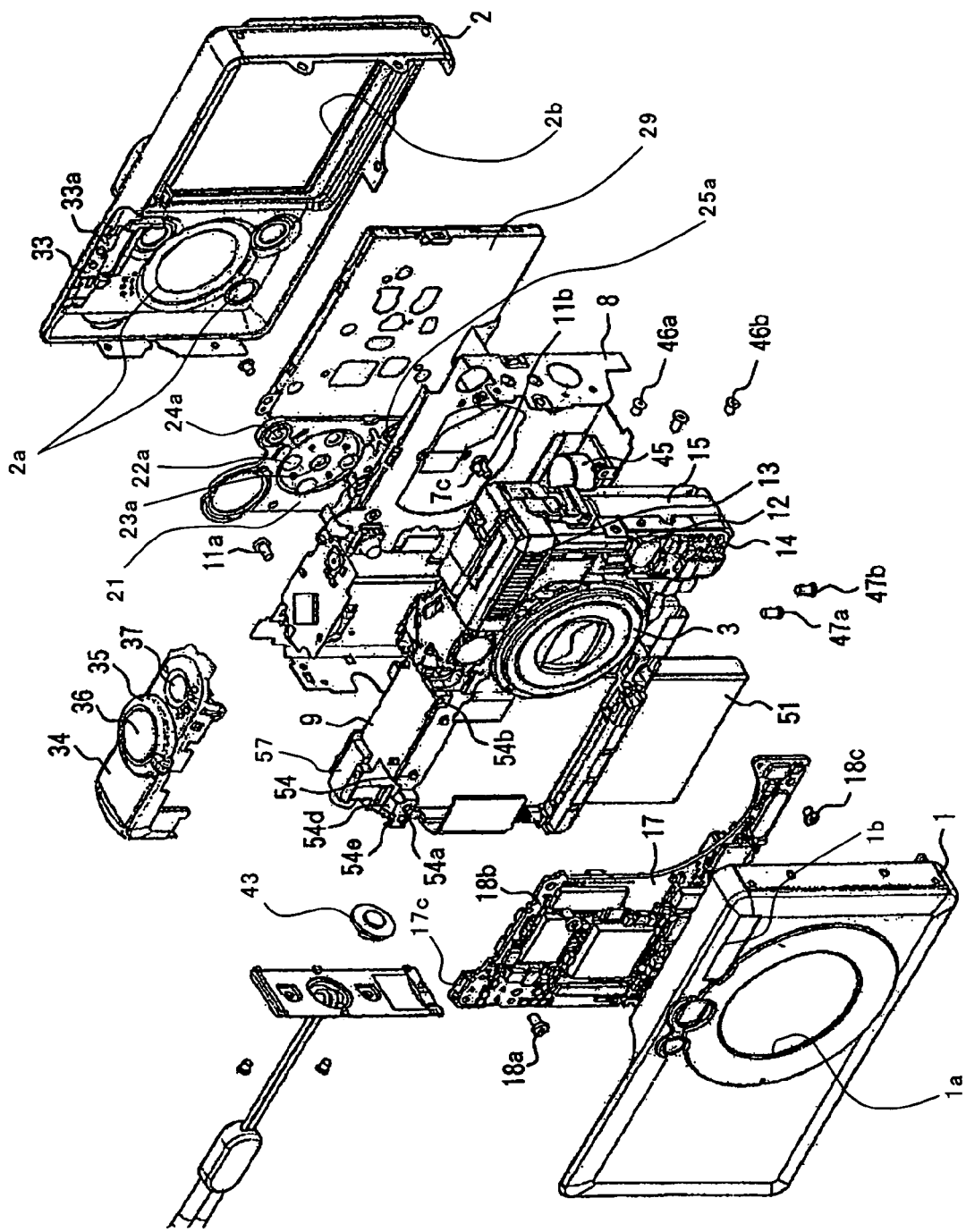
FIG. 1 is an exploded perspective view of a camera according to one embodiment of the present invention.
Figure 2:
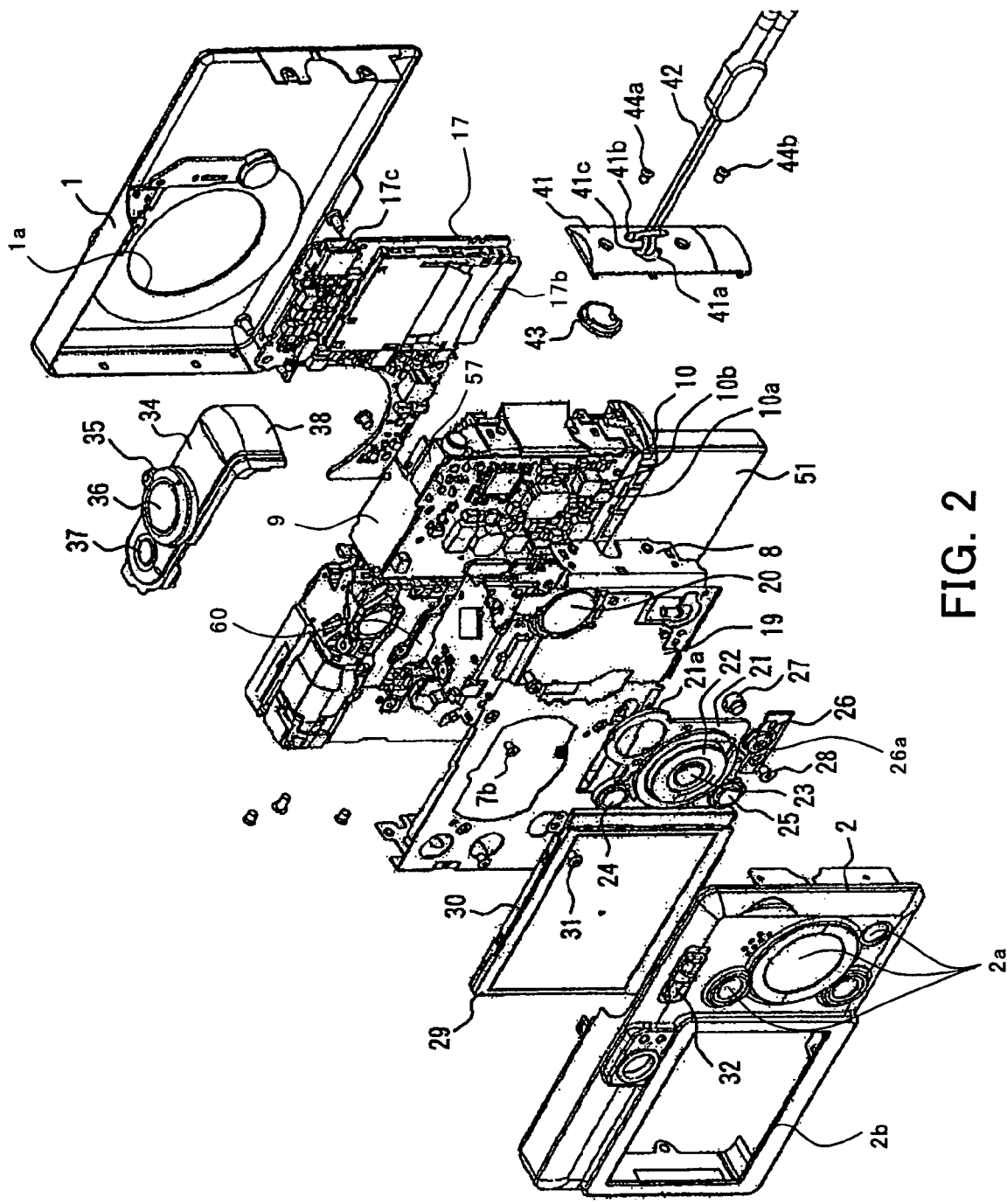
FIG. 2 is an exploded perspective view of a camera according to this embodiment.

FIG. 1 is an exploded perspective view of a digital camera as an image-taking apparatus and electronic apparatus according to one embodiment of the present invention. FIG. 2 is another exploded perspective view. In the following description, a side of the camera on which a lens barrel is provided is referred to as a front, and a side on which a liquid crystal panel is provided is referred to as a back. In addition, a lateral direction is defined as a direction orthogonal to the image-taking optical axis, with which the lens barrel and the battery case are aligned.

In these figures, 1 is a front cover that covers the front surface of the camera. 2 is a rear cover that covers its rear surface. The front cover 1 and the rear cover 2 constitute a camera exterior. The digital camera is incorporated with an image-pickup device 60, such as a CCD sensor and a CMOS sensor (although FIG. 2 shows a back surface of the image-pickup device 60), and a subject image formed by the image-pickup device 60 is converted into an electric signal and output as an image signal. The lens barrel 3 and the image-pickup device 60 structure an image-taking system.

3 denotes a lens barrel that holds an image-taking lens, etc. The lens barrel 3 is incorporated with a finder unit, a zoom motor 5 and a gear unit 6. The lens barrel 3 is fixed onto a chassis 8 by fixing screws 7a, 7b and 7c. Formed in the front cover 1 are an opening 1a that exposes the lens barrel 3, an opening 1b that exposes an illumination unit, which will be described later, a photometric window, and a viewfinder window.

9 denotes a battery case as a battery loading part into which a battery 51 is detachably loaded, and the battery loading part 9 is fixed onto the chassis 8 by screws 11a and 11b. 10 denotes an analog (or second) substrate that is mounted with an analog electronic component, and incorporated between the battery case 9 and the chassis 8.

The analog substrate 10 is further mounted with a D/A converter that converts an image signal from an image processing LSI into an analog signal, a buffer circuit that increases a driving force of an analog signal from the D/A converter, and the like.

Figure 3:
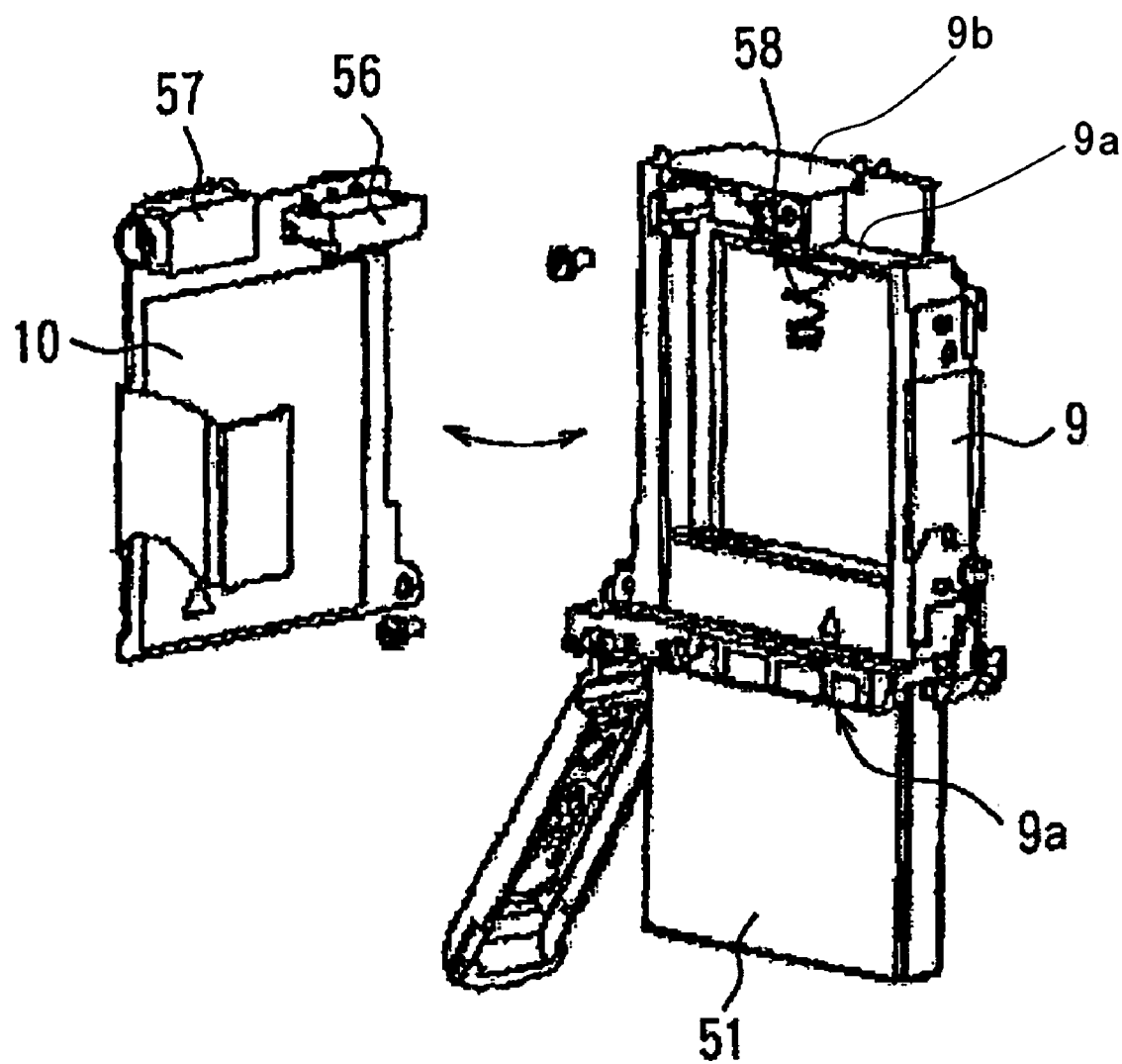
FIG. 3 is a view around a battery case according to this embodiment, from which an analog board is detached.
Figure 4:
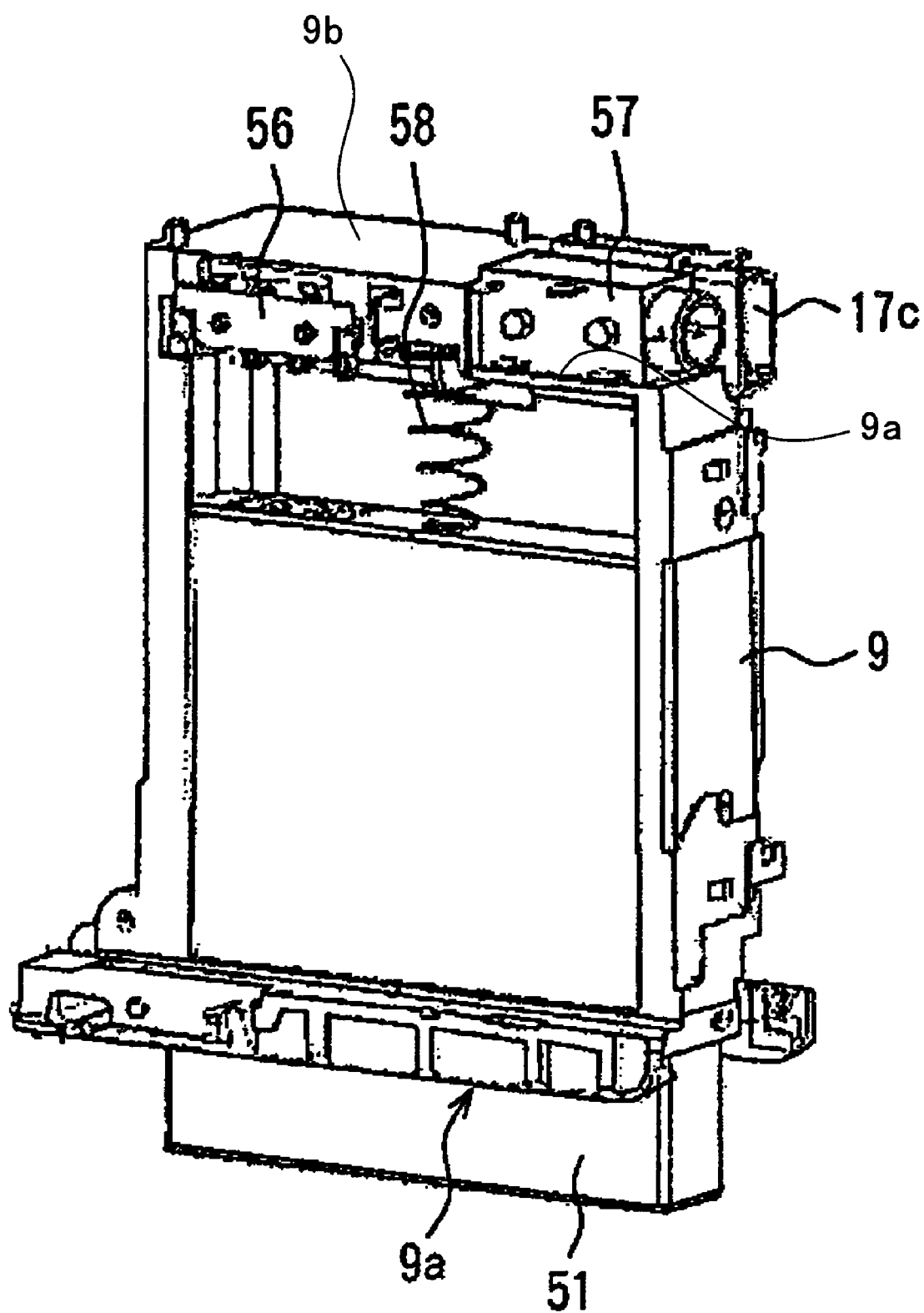
FIG. 4 is a view showing of a component arrangement above the battery.

As shown in FIGS. 3 and 4, a rectangular opening 9a is provided in the front bottom of the battery case 9, and covered with the analog substrate 10 that is incorporated between the battery case 9 and the chassis 8. A holding part 9b that holds a battery armature 56 and an ejection spring 58, which will be described later, and a surface 9a below the top surface of the holding part 9b are formed at the top of the battery case 9 or at its end in the battery loading direction.

51 denotes a battery that serves as a power supply for the digital camera, and is loaded into the battery case 9.

The ejection spring 58 that contacts almost the center of the top surface of the loaded battery 51 is provided in the battery case 9. According to the above structure, in loading the battery 51 into the battery case 9, the ejection spring 58 is compressed by the battery 51. When a battery unlock button (not shown) is pressed while the battery 51 is being loaded into the battery case 9, the spring force of the compressed ejection spring 58 ejects the battery 51 from the battery case 9.

The battery armature 56 that contacts the electrode of the battery 51 and an analog output (or second) connector 57 that outputs analog signals, such as images and voices, are mounted onto the front surface of the analog substrate 10 on the battery case 9 side, and are engaged with concaves 10b and 10c in the battery case 9.

An insulating sheet (not shown) is adhered to a surface of the analog substrate 10 on the battery case side 9, and protects a through-hole in the substrate, etc. The insulating sheet has an approximately triangular hole.

The position of the hole accords with an insertion direction instruction mark (not shown) on the battery 51 in the lateral direction. The insertion of the battery 51 into the battery case 9 becomes easier with an alignment between the hole position and the mark position. The visibility of the hole improves through silk printing on the analog substrate at the hole position provided on the insulating sheet.

In FIGS. 1 and 2, 12 is an illumination unit having a light emitting part 13 at its top. An illumination optical system flexible printed board 14 mounted with an illumination drive circuit is adhered to a frame part that extends under the camera, and an illumination condenser 15 is fixed onto the frame part.

The illumination unit 12 is arranged in front of the gear unit 6 and zoom motor 5 incorporated into the lens barrel 3, and fixed onto the chassis 8 via a screw 16 from its side surface. The light emitting part 13 in the camera lateral direction is approximately as large as a combination of the gear unit 6 and the zoom motor 5 in the camera lateral direction, thereby maximizing a space behind the irradiation optical-axis direction of the light emitting part 13. The gear unit 6 and the zoom motor 5 are arranged at the back in the optical-axis direction.

17 denotes a digital (or first) substrate mounted with digital electronic components, such as a CPU, a memory and an image processing LSI. The digital substrate 17 faces the analog or second substrate 10. A slot 17a of a semiconductor memory card 17b as an external memory and a USB (or first) connector 17c that outputs a digital signal are mounted on the rear surface side of the digital substrate 17. The USB connector 17c and the analog connector 57 are arranged parallel to a direction in which the digital substrate 17 opposes to the analog substrate 10. The USB connector 17c and the analog connector 57 are arranged along a surface 9a under the top surface of the battery case 9. Thereby, the top surfaces of both the connectors 17c and 57 are approximately level with that of the holding part 9b of the battery case 9. The digital substrate 17 is fixed onto the battery case 9 and the chassis 8 by the screws 18a to 18c.

19 denotes an operational flexible printed board mounted with an operational members, such as a release switch 19a, and a power switch 19b. 20 denotes a speaker. The terminal of the speaker 20 is soldered to one end of the operational flexible printed board 19. 21 denotes an operational button base member made of silicon rubber. A cross button 22 and a center button 23, and push buttons 24 and 25 are attached to the rear surface of the operational button base member.

The rear cover 2 has an opening 2a that exposes these buttons from the camera rear surface.

Metal domes 22a to 25a corresponding to the above operational buttons 22 to 25 are adhered to the front surface of the operational button base member 21. When each operation button is pressed, the corresponding metal dome contacts a conductive pattern formed on the operational flexible printed board 19, and the conductive pattern is electrified.

21a denotes a ring-shaped buffer member that is formed on the operational button base member 21, and adapted to enclose the outer peripheral of the speaker 20. The buffer member 21a clogs an aperture between the speaker 20 and the rear cover 2. The number of components and cost can be reduced, because the conventional buffer member can be omitted, such as urethane foam, which serves to prevent sound leakage etc. and is adhered to the top of the speaker.

26 denotes a light-emitting button. An operational member 26a is provided at the center of the light-emitting button 26, and exposes from the camera rear surface through the opening 2a in the rear cover 2. A convex light guide member 27 is adhered to the back of the operational part 26a. A tact switch W10a is mounted on the analog substrate 10 in front of the guide member 27. The tact switch 10a is configured to switch when the light guide member 27 is pressed toward the front of the camera.

An LED 10b is provided near the tact switch 10a in a direction orthogonal to the optical axis. The light emitted from the LED 10b is configured to enter the surface of the light-emitting button 26 via the light guide member 27. A base part of the light-emitting button 26 is fixed onto the chassis 8 via a screw 28.

29 denotes an LCD panel, which is held with a backlight (not shown) by an LCD holder 30. The LCD holder 30 is fixed onto the chassis 8 by a screw 31. The rear cover 2 has a rectangular opening 2b that exposes a display surface of the LCD panel 29.

32 denotes a switch button that is provided at the top of the rear cover 2, and switches the camera's operational mode. When the switch button 32 is slid in the lateral direction of the camera, the operational mode is switched among a still picture taking mode, a motion picture taking mode, and an image reproducing mode.

33 denotes a fixture plate arranged opposite to the switch button 32 (inside the camera) with respect to the rear cover 2, and slidable with the switch button 32 in the lateral direction. An opening 33a in the fixture plate 33 holds a movable part of a mode switch (not shown) mounted on the operational flexible printed board 19. When the switch button 32 is operated laterally, the mode switch switches the operational mode.

34 denotes a button holder that holds a release button 36 and a power button 37, and constitutes the exterior that covers the top of the battery case 9. A connector cover 38 is provided at one end of the button holder 34, and extends downwardly in the camera. The connector cover 38 covers the USB connector 17c provided on the digital substrate 17, and an image/voice connector 57 that is provided on the analog substrate 19 and adjacent to the USB connector 17c in the longitudinal direction of the camera.

41 denotes a strap attachment member used to attach the strap 42. The strap attachment member 41 is molded by die casting for strength and design purposes. The strap attachment member 41 covers the side surface of the camera, and forms long holes 41a and 41b almost the center in the longitudinal direction. The strap 42 is put on a hanger 41c between the long holes 41a and 41b.

43 denotes a semispherical concave inner member opposing to the inner surface of the strap attachment member 41. The inner member 43 is engaged with the long holes 41a and 41b from the inside of the strap attachment member 41.

In inserting the strap 42 into the long hole 41a from the outside of the camera, the tip of the strap 42 slides on the concave surface of the inner member 43 and drawn to the outside the camera from the long hole 41b for the easy attachment of the strap 42.

The inner member 43 covers the edges of the long holes 41a and 41b, and prevents the strap string 42 from contacting these edges and being severed.

The side cover 41 is fixed onto the chassis 8 when the front cover 1, the rear cover 2 and the inner member 43 are held between the screws 44a and 44b. 45 denotes a tripod attachment seat having a screw hole used to attach a tripod.

When the screws 46a and 46b are engaged with the side surfaces and the screws 47a and 47b are engaged with the bottom surfaces while the front cover 1 is engaged with the rear cover 2. Thereby, the front cover 1 and the rear cover 2 are fixed together.

As described above, this embodiment arranges the analog substrate 10 and the digital substrate 17 opposite to each other via the battery 51, and provides the USB connector 17c for digital signals on the digital substrate 17 and the connector 57 for analog signals on the analog substrate 10. These connectors 17c and 57 oppose to each other in the longitudinal direction, and are provided above the battery 51.

In other words, the USB connector 17c and the analog connector 57 are arranged between the analog substrate 10 and the digital substrate 17 which oppose to each other. This configuration can maximize the space above the battery 51, and miniaturize the camera.

This embodiment arranges the top of the ejection spring 58 used to eject the battery 51 is arranged in the space among the USB connector 17c, the analog connector 57, and the battery armature 56, and maximizes the space. This embodiment arranges the ejection spring 58 in the lateral direction among the USB connector 17c, the analog connector 57, and the battery armature 56, and maximizes the space above the battery case 9 and provides a smaller size of the camera.

In addition, this embodiment arranges the battery 51 that has an electromagnetic shielding effect, between the analog substrate 10 and the digital substrate 17, preventing the interferences between circuits, blocking the electromagnetic waves, and enabling the battery armature 57, the analog substrate 10 and the digital circuit 17 to be arranged close to one another. The potential of each circuit approaches to the reference voltage of the battery 51, reducing the potential differences among circuits and the resultant noises.

Moreover, the battery armature 56 provided on the analog substrate improves the functions of the analog circuit that is subject to the potential difference.

While the above embodiment describes the camera as an example, the present invention is applicable to other electronic apparatuses, e.g., an image display apparatus (such as a projector), and an imaging apparatus (such as a copier).

This application claims a foreign priority based on Japanese Patent Application No. 2004-270697, filed Sep. 17, 2004, which is hereby incorporated by reference herein.

What is claimed is:

1. An image-taking apparatus comprising:
   an image-taking system for obtaining an image of a subject, said image-taking system including a lens and an image pickup device;
   a battery accommodation chamber, in which a battery is accommodated, said battery accommodation chamber being arranged in a first direction orthogonal to an image-taking optical axis of said image-taking system;
   a connector for external connections; and
   a contact member contactable with an electrode of the battery accommodated in said battery accommodation chamber,
   wherein said battery accommodation chamber includes a spring for forcing the battery in an ejecting direction, said spring being arranged between said connector and said contact member along the first direction.

2. An image-taking apparatus according to claim 1, further comprising:
   a first substrate; and
   a second substrate,
   wherein said first and second substrates are arranged at both sides of said battery accommodation chamber in a second direction parallel to the image-taking optical axis, and
   wherein the said battery accommodation chamber, said connector, said spring and said contact member are arranged between said first and second substrates.

3. An image-taking apparatus comprising:
   an image-taking system for obtaining an image of a subject, said image-taking system including a lens and an image pickup device;
   a battery accommodation chamber, in which a battery is accommodated, said battery accommodation chamber being arranged in a place not to overlap said image-taking system in a direction of thickness of said image-taking apparatus;
   a first substrate having a first connector for an external connection of a digital signal; and
   a second substrate having a second connector for an external connection of an analog signal,
   wherein said first and second substrates are arranged at both sides of said battery accommodation chamber in a direction of thickness of said image-taking apparatus, and
   wherein said first and second substrates are arranged such that said first and second connectors are aligned with the direction of thickness of said image-taking apparatus.

4. An image-taking apparatus according to claim 3, further comprising:
   a contact member contactable with an electrode of the battery accommodated in said battery accommodation chamber,
   wherein said contact member is connected with said second substrate.

5. An image-taking apparatus according to claim 4, wherein said contact member is arranged such that said contact member and said second connector are aligned with a direction orthogonal to the direction with which the first and second connectors are aligned.

6. An image-taking apparatus comprising:
   an image-taking system for obtaining an image of a subject, said image-taking system including a lens and an image pickup device;
   a battery accommodation chamber, in which a battery is accommodated, said battery accommodation chamber being arranged in a first direction orthogonal to an image-taking optical axis of said image-taking system;

a first substrate having a first connector for an external connection of a digital signal; and a second substrate having a second connector for an external connection of an analog signal and a contact member contactable with an electrode of the battery accommodated in said battery accommodation chamber, wherein said first and second substrates are arranged at both sides of said battery accommodation chamber in a second direction parallel to the image-taking optical axis.

* * * * *